UNITED STATES PATENT OFFICE 2,542,336

TITANIUM ACTIVATED MAGNESIUM ORTHOSTANNATE

Ferdinand Anne Kröger and Jan Theodoor Gerard Overbeek, Eindhoven, Netherlands, assignors to General Electric Company, a corporation of New York No Drawing. Application October 23, 1946, Serial No. 705,229. In Belgium May 1, 1945

Section 1, Public Law 690, August 8, 1946
Patent expires May 1, 1965

1 Claim. (Cl. 252—301.4)

This invention relates to fluorescent materials or phosphors which may be used in combination with electric discharge devices such as cathode ray tubes or mercury vapor discharge lamps.

The phosphors comprising the present invention are adapted to transform into blue or green light the energy of electrons or short wave ultraviolet radiations. There is a need for such phosphors in order to permit selections for given applications among a larger number of phosphors. Thus, all the possible benefits may be derived from the particular properties of the selected substance, without including luminescence of an undesirable nature.

According to the present invention we have discovered a new series of phosphors containing titanium as activator and having a matrix composed of one or more of the oxides of zirconium, hafnium, thorium, germanium or tin, to which may be added either acid oxides or basic oxides or both. Suitable basic oxides are the oxides of sodium, potassium, rubidium, cesium, lithium, barium, calcium, strontium, magnesium, beryllium and zinc. The acid oxides are those of the group $SO_3$, $B_2O_3$, $P_2O_5$ and $SiO_2$. The quantity of titanium is preferably such that the material contains at least 0.001 and at most 50 mol per cent of the sum of the oxides of titanium, zirconium, hafnium, thorium, silicon, germanium and tin.

In the phosphors comprising our invention, the titanium is in the tetravalent state within the lattice structure of the substance where it replaces, in part, one of the elements forming the basis of the matrix, to wit: zirconium, hafnium, thorium, silicon, germanium or tin. The quantity of titanium which is thus contained in the substance may be much larger than the quantity which is normally present as activator in luminescent substances.

The following are examples of specific phosphor compositions comprising our invention:

Example I

Zirconium oxide activated by 0.001 to 10 mol per cent of titanium added as $TiO_2$. It emits a greenish light having its maximum emission at 4700 Angstroms. It is excited by ultra-violet rays of wavelength of 3850 Angstroms and less, as well as by electron rays.

Example II

Magnesium stannate activated by titanium. The stannate may be of ortho composition or more basic. It emits blue light having a maximum at 4480 Angstroms when excited by electron rays and by ultra-violet rays having a wavelength less than 2800 Angstroms.

Example III

Calcium zirconate activated by titanium. The matrix may be of the meta composition ($CaZrO_3$) or more basic. It emits blue light and is excited by ultra-violet rays having a wavelength of 2700 Angstroms and less, as well as by electron rays.

Example IV

Zirconium phosphate activated by titanium. The matrix may be of pyrophosphate composition ($ZrP_2O_7$) or slightly more acid. It has a blue emission and is excited by ultra-violet rays having a wavelength of 2537 Angstroms and less, as well as by electron rays.

The use of substances comprising the present invention in discharge tubes provides a means of modifying the spectral distribution between given limits, and this makes it possible to select the substance which is most suitable for a given application. When these materials are used in discharge tubes generating ultra-violet rays, the luminescence is essentially created by rays having a wavelength less than 3000 Angstroms. The material may be mixed with other phosphors which emit light of different colors, for instance red.

In preparing the materials, one or several of the oxides of zirconium, hafnium, thorium, germanium or tin are heated in non-reducing atmosphere with or without the acid and/or basic oxides specified above, together with titanium oxide at such a temperature that the component elements become diffused and/or react with one another.

The following are several examples of methods of preparing phosphors in accordance with the invention:

Example A 40 grams of zirconium oxychloride are dissolved in diluted hydrochloric acid. To the solution thus obtained there is added 1.5 cubic centimeters of a solution of titanium tetrachloride containing per cubic centimeter the equivalent of 10 milligrams of $TiO_2$.

An excess of ammonia is added to this solution, and the resulting precipitate is then filtered, dried and heated for one hour in an oxidizing atmosphere at a temperature of 1300° C. The resulting product when irradiated by ultra-violet rays or bombarded by electrons emits a green luminescence.

Example B

Dissolve 31.9 grams of zirconium oxychloride and 10 grams of calcium carbonate in diluted hydrochloric acid. To this solution add 8 cubic centimeters of a solution of titanium tetrachloride (10 milligrams of $TiO_2$ per cubic centimeter). The addition of an excess of ammonia produces a precipitate which after filtering, drying and heating for two hours in an oxidizing atmosphere at 1300° C. leaves a product which under the effect of ultra-violet rays and electrons emits a beautiful blue luminescence.

*Example C*

40 grams of magnesium oxide are dissolved in hydrochloric acid. To this solution there is added a solution of 170 grams $SnCl_2$ and 800 cubic centimeters of a titanium tetrachloride solution (10 milligrams of $TiO_2$ per cubic centimeter). The addition of an excess of ammonia produces a precipitate which is filtered and dried. The dry substance is preheated at 600° C. and is then heated for one to two hours in an oxidizing atmosphere at a temperature of 1250° C. The product emits a bluish luminescence when excited by shortwave ultra-violet rays or by electrons.

What we claim as new and desire to secure by Letters Patent of the United States is:

A fluorescent material consisting essentially of magnesium ortho-stannate activated by titanium in an amount of $TiO_2$ between 0.001 and 50 mol per cent of the sum of the oxides of titanium and tin in the composition.

FERDINAND ANNE KRÖGER.
JAN THEODOOR GERARD OVERBEEK.

REFERENCES CITED

The following references are of record in the file of this patent:

UNITED STATES PATENTS

| Number | Name | Date |
|---|---|---|
| 2,171,145 | Leverenz | Aug. 29, 1939 |
| 2,244,558 | Krautz | June 3, 1941 |
| 2,310,242 | Kinzie | Feb. 9, 1943 |
| 2,415,129 | Froelich | Feb. 4, 1947 |